(12) United States Patent
Ciarrocchi

(10) Patent No.: US 11,634,112 B2
(45) Date of Patent: Apr. 25, 2023

(54) HYDRAULIC ARRANGEMENT FOR TRACTOR-TRAILER BRAKE HYDRAULIC CIRCUITS

(71) Applicant: CNH Industrial America LLC, Racine, WI (US)

(72) Inventor: Marco Pietro Ciarrocchi, Sant'Omero (IT)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 25 days.

(21) Appl. No.: 17/054,464

(22) PCT Filed: May 9, 2019

(86) PCT No.: PCT/EP2019/061972
§ 371 (c)(1),
(2) Date: Nov. 10, 2020

(87) PCT Pub. No.: WO2019/215298
PCT Pub. Date: Nov. 14, 2019

(65) Prior Publication Data
US 2021/0155208 A1    May 27, 2021

(30) Foreign Application Priority Data
May 10, 2018  (IT) .................. 102018000005234

(51) Int. Cl.
*B60T 15/22*   (2006.01)
*B60T 11/10*   (2006.01)
*B60T 7/20*    (2006.01)

(52) U.S. Cl.
CPC .............. *B60T 15/226* (2013.01); *B60T 7/20* (2013.01); *B60T 11/108* (2013.01)

(58) Field of Classification Search
CPC ........ B60T 7/20; B60T 11/108; B60T 15/206; B60T 15/226; B60T 15/304
See application file for complete search history.

(56) References Cited

U.S. PATENT DOCUMENTS 4,243,271 A * 1/1981 Dwyer .................. B60T 13/167
                                                         303/7
4,343,517 A * 8/1982 Levington ............. B60T 13/143
                                                         303/7

(Continued)

FOREIGN PATENT DOCUMENTS

EP        1281592 A2      2/2003

OTHER PUBLICATIONS

PCT/EP2019/061972; International Search Report/Written Opinion dated Sep. 11, 2019; 11 pages.

*Primary Examiner* — Thomas J Williams
(74) *Attorney, Agent, or Firm* — Rickard DeMille; Rebecca Henkel

(57) ABSTRACT

A hydraulic arrangement for connecting a tractor hydraulic brake circuit to a trailer hydraulic brake circuit is disclosed. The hydraulic arrangement includes a coupler stage fluidly connecting a source of fluid in pressure to the trailer braking hydraulic circuit and a trailer brake valve fluidly connecting the tractor hydraulic brake circuit and the trailer hydraulic brake circuit. The hydraulic arrangement further includes a selection pilot stage fluidly connected to the source of fluid in pressure and being fluidly connectable to the trailer hydraulic brake circuit via at least a connector and a selection stage fluidly connected to the selection pilot stage and to the trailer brake valve. The selection stage being configured to impart an actuation signal to the trailer brake valve in function of an hydraulic signal coming from the selection pilot stage.

11 Claims, 3 Drawing Sheets

(56) References Cited

U.S. PATENT DOCUMENTS

| | | | |
|---|---|---|---|
| 8,240,777 B2* | 8/2012 | Heren | B60T 13/686 |
| | | | 303/7 |
| 9,327,694 B2* | 5/2016 | Klostermann | B60T 8/171 |
| 2009/0127927 A1 | 5/2009 | Heren et al. | |
| 2018/0029572 A1* | 2/2018 | Schick | B60T 15/028 |

* cited by examiner

HYDRAULIC ARRANGEMENT FOR TRACTOR-TRAILER BRAKE HYDRAULIC CIRCUITS

CROSS-REFERENCE TO RELATED APPLICATION

This application claims benefit of and is a National Stage entry from PCT Application No. PCT/EP2019/061972, filed on May 9, 2019; which claims priority to and benefit of Italian Application No. IT 102018000005234, filed on May 10, 2018, both of which are entitled "Hydraulic Arrangement for Tractor-Trailer Brake Hydraulic Circuits", both of which are herein incorporated by reference in their entirety.

TECHNICAL FIELD

The present invention concerns an hydraulic arrangement, in particular an hydraulic arrangement for connecting tractor-trailer hydraulic circuits.

BACKGROUND OF THE INVENTION

Trailer may be connected to the brake hydraulic circuit of a tractor thanks to known tractor-trailer brake valve configured to allow piloting of the trailer brake pressure.

Tractor field has been recently invested from modification under so-called "Mother Regulation" (MR), i.e. European Regulation 167/2013, aimed to harmonize the homologation procedure of tractor and tractor-related devices in European Union. Tractors and trailers brake systems have been obviously involved by the aforementioned regulation.

Mother regulation foresees the presence of two hydraulic control lines in tractors control brake circuit, a first control line and a supplementary line. Supplementary line is designed for safety purpose while control line is designed to control brake via known hydraulic circuit.

Since the hydraulic coupler between trailer and tractor is the same and may be used to connect an old trailer to a MR tractor, known tractor-trailer brake valve comprises electronic means configured to detect the typology of trailer which is connected to the valve and consequently regulate the pressure in trailer brake hydraulic circuit.

In fact, since the hydraulic command curve of brake of non-MR trailers is different with respect to MR trailers, the hydraulic circuit may not ensure enough pressure to generate a correct braking effect on the trailer.

However, electronic tractor-trailer brake valve needs a specific electric power supply and a related system of control and therefore they are complex and expensive.

In view of the above, the need is felt to provide a tractor-trailer brake valve allowing a safe connection between a non-MR trailer with a MR tractor in an optimized and cost-effective way.

An aim of the present invention is to satisfy the above mentioned needs.

SUMMARY OF THE INVENTION

The aforementioned aim is reached by an hydraulic arrangement for controlling a tractor-trailer brake valve as claimed in the appended set of claims.

BRIEF DESCRIPTION OF THE DRAWINGS

For a better understanding of the present invention, a preferred embodiment is described in the following, by way of a non-limiting example, with reference to the attached drawings wherein.

DETAILED DESCRIPTION OF THE INVENTION

Figure 1:
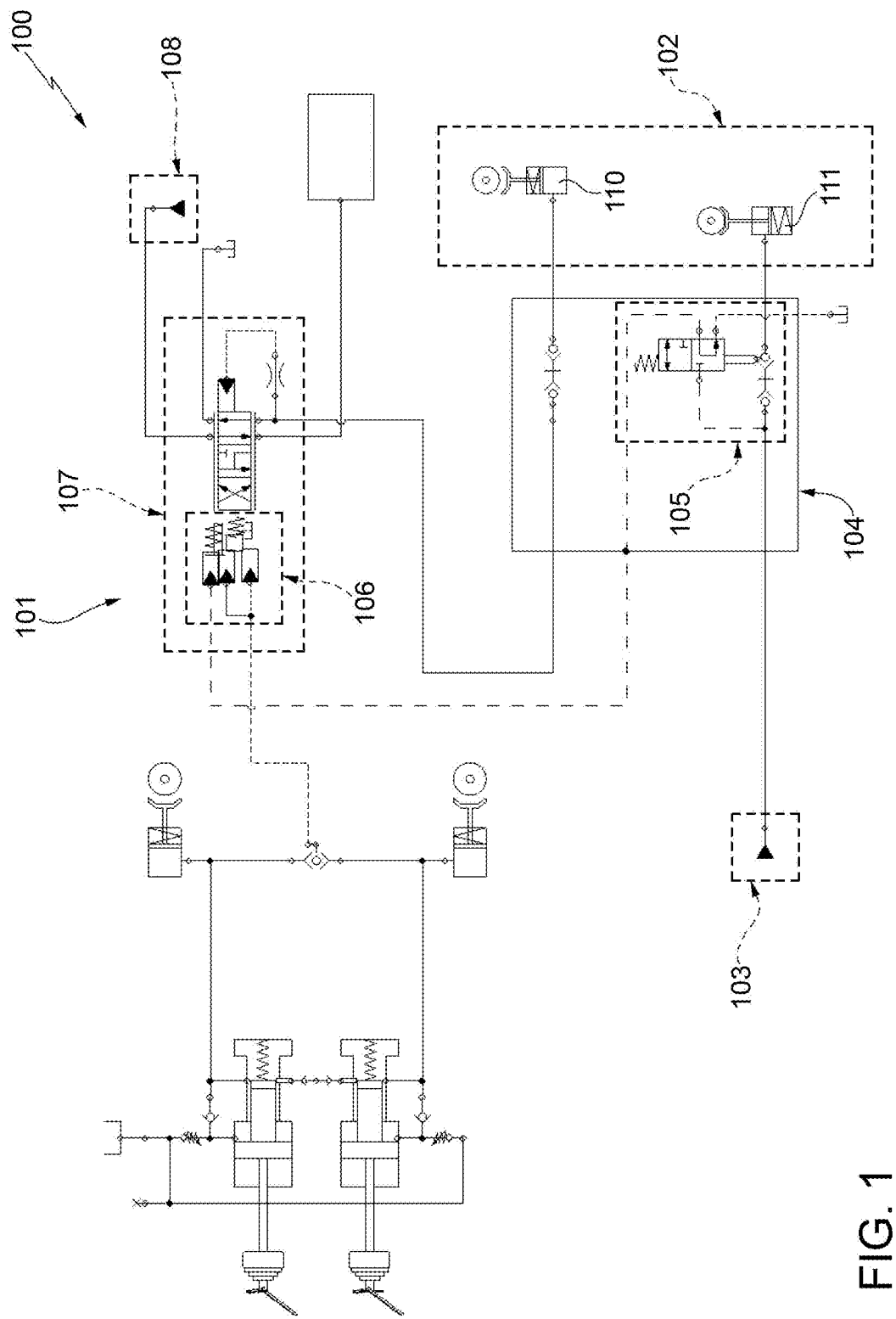
FIG. 1 is a scheme of an hydraulic arrangement for controlling a tractor-trailer brake valve according to the present invention.

In FIG. 1 it is discloses, as functional scheme, an hydraulic arrangement 100 configured to connect the braking hydraulic circuit 101 of a tractor with braking hydraulic circuit 102 of a trailer.

Such hydraulic arrangement 100 comprises essentially a source of fluid 103 in constant pressure coming from tractor hydraulic circuit (e.g. driveline control at 20-26 bar), a coupler stage 104 fluidly connectable to trailer braking hydraulic circuit 102 and a selection pilot stage 105 fluidly connected to coupler stage 104. Preferably selection stage 105 is realized integrated in coupler stage 104.

Hydraulic arrangement 100 further comprises a curve selection stage 106 fluidly connected to coupler stage 104, in particular to selection pilot stage 105, and to tractor brake hydraulic circuit 101 and a hydraulic trailer brake valve 107. Preferably selection stage 106 is realized integrated in trailer brake valve 107. Trailer brake valve 107, as known, is fluidly connected to a source of fluid 108 at high pressure (i.e. 150 bar about), e.g. a main pressure pump and/or a tractor tank, and to a drain of tractor hydraulic circuit.

Coupler stage 104 may be connected to trailer braking hydraulic circuit 102 via a first connector 110 and a second connector 111. First connector 110 is a connector voted to standard line connection of trailer brake hydraulic circuit while second connector 111 is a connector voted to supplementary line connection of trailer brake hydraulic circuit according to Mother regulation.

Selection pilot stage 5 essentially comprises a valve 7 comprising a body 8 comprising a first opening 10 fluidly connected to a source of fluid at fixed pressure coming from tractor circuit, a second opening 11 fluidly connected to curve selection stage 106, a third opening 12 fluidly connected to discharge and a fourth opening 13 fluidly connectable to trailer brake supplementary line via second connector 111. First and fourth openings 10, 13 are fluidly connected via a conduit 14.

Valve 7 further comprises a chamber 15 fluidly connected with second opening 11 and closed with respect the environment thanks to a cap 16. Chamber 15 is fluidly connected to conduit 14 thanks to a duct 18 which is moreover fluidly connected to third opening 12.

Valve 7 further comprises a spool 20 housed in a sealed and movable way into duct 18. In particular spool 20 may have a substantially cylindrical shape comprising a first head 21 directed towards opening 13 and a second head 22 directed towards cup 16. Advantageously second head 22 has a diameter configured to engage in a sealing way opening of duct 18 in chamber 15 in order to isolate chamber 15 from duct 18, i.e. from opening 12.

Spool 20 comprises an intermediate portion 23 extending between first and second heads 21, 22 and having a diameter lower than the diameter of duct 18 and comprising a by-pass channel 24 extending from first heat 21 to second head 22 and configured to allow a direct fluidic communication between duct 14 and chamber 15 by-passing duct 18.

Spool 20 may further comprise a sealed coupling 25 carried by intermediate portion 23 and configured to cooperate in a movable and sealant way with inner surface of duct 18. Preferably, sealed coupling 25 may comprise a couple of flanges 26 extending radially and annularly form external surface of intermediate portion 23 and having an external diameter equal to inner diameter of duct 18 and defining between them an annular seat configured to house a sealant member 28, such as an o-ring.

Valve 7 moreover comprises elastic means housed in chamber 15 and interposed between cap 16 and spool 20, configured to impart a force to spool 20 to maintain second head 22 in sealed contact with duct 18 when no forces are acting on first head 21. Preferably such elastic means comprise a first spring 28, more preferably a coil spring and cap 16 and spool 20 each comprise respective seats configured to allow their coupling with end portions of first spring 28.

Valve 7 further comprises a coupler 30 carried by body 8, partially housed in opening 13 and configured to connect valve 3 to trailer brake supplementary line via second connector 102. Coupler 30 may be a ISO 16028 coupler having a designed exterior shape to couple with second connector 102 and has a first opening 31 substantially corresponding to third opening 13 of body 8 and a second opening 32 placed beyond body 8 of valve 7.

Coupler 30 is hollow and defines an interior volume 33 in which first head 21 and a portion of intermediate portion 23 of spool 20 may be housed. Coupler 30 further comprises an actuator 34 housed in inner volume 33, having a substantially cylindrical shape and comprising a first head 35 configured to cooperate with second opening 32 of coupler 30 to define a sealed engagement and a second head 36 configured to cooperate with first head 21 of spool 20.

Valve 7 moreover comprises elastic means housed in inner volume 33 of coupler 30 and interposed between first and second openings 31 and 32 and configured to impart a force to actuator 35 to maintain first head 35 in sealed contact with second opening 31 when no forces are acting actuator 35. In particular, elastic means comprise a second spring 37, more preferably a coil spring, and first and second openings 31 and 32 each comprise respective seats configured to allow the coupling of end portions of second spring 37.

As already said, second opening 11 is fluidly connected to trailer brake valve 107 which comprises curve selection stage 106.

Curve selection stage 106 essentially comprises a valve 50 essentially comprising a body 51 having a first opening 52 fluidly connected to second opening 11 of valve 7, a second opening 54 fluidly connected to tractor brake circuit 101, and a third opening 53 cooperating with trailer brake valve spool as described hereunder.

Valve body 51 defines an inner volume 55 fluidly communicating, in separate way, with first and third openings 52, and 53. Advantageously valve body 51 may comprise a main portion 57 defining first and third openings 52, 54 and a separable portion 56 carried by main portion 57, substantially realized as a cap and configured to allow inspection of inner volume 55 of valve 7.

Valve 50 comprises a first spool 60 housed in inner volume 55 and movable between two position, i.e. between a first end-stop 61 defined by separable portion 56 and by a second end-stop 62.

Advantageously, second end-stop 62 is defined by a bushing 63 housed inside inner volume 55 and carried by body 8 in proximity of second opening 54. Bushing 63 may comprise an annular portion 64 cooperating with a corner of inner volume 55 and a cylindrical portion 65 extending from annular section 64 towards first spool 60 and having and outer diameter lower than the outer diameter of annular portion 64. Preferably, inner diameter of cylindrical portion 65 is the equal to the diameter of second opening 54.

Preferably, spool 60 comprises an annular portion 71 cooperating in a sealant way with an inner lateral surface of inner volume 55 and a cylindrical portion 72 extending axially from inner circumference of annular portion 71 towards separable portion 56 and having and outer diameter lower than the outer diameter of annular portion 71. Preferably first end-stop 61 is realized by a recess 73 configured to house a portion of cylindrical portion 72.

Preferably the free movement L of spool 60 in inner volume 55 is equal to the axial distance between an extremity of portion 65 of bushing 63 and spool 60 when spool 60 is totally housed into recess 73.

Spool 60 is preferably hollow defining a cylindrical volume 68 delimited axially by the longitudinal extension of spool 60 and laterally by an inner surface of annular portion 71 and cylindrical portion 72.

Valve 50 further comprise first elastic means axially interposed between spool 60 and body 51, in particular arranged in the space comprised between bushing 63 and the inner surface of chamber 55. First elastic means are configured to impart a force to spool 60 to maintain this latter housed in recess 73 of separable portion 65 of valve 50. Preferably first elastic means comprise a spring 75, more preferably a coil spring; advantageously annular sections 64, 71 of bushing 63 and spool 60 may be realized to comprise respective seats configured to allow the coupling of end portions of second spring 75.

Valve 50 further comprises a second spool 80 housed in a movable manner in third opening 54, second spool 80 is the main spool of trailer brake valve 107.

Valve 50 moreover comprises second elastic means axially interposed between second spool 80 and an actuator 90 and configured to impart a relative force between these aforementioned elements. Preferably second elastic means comprise a spring 85, more preferably a coil spring; advantageously end portions of second spring 85 are finished so as to be coupled with an axial surface of second spool 80 and actuator 90 to impart the mentioned force.

Actuator 90 is housed in inner volume 68 defined by spool 60 in a movable manner, in particular actuator 90 may move along the entire length of spool 60 from an end-stop position defined by the coupling of an annular flange 74 extending at axial inner edge of annular portion 72 from inner surface toward the longitudinal axes of spool 60.

Advantageously, actuator 90 comprises an inner portion 91 and an outer portion 92 carried in a movable manner by inner portion 91. Preferably inner portion 91 comprises an terminal annular portion 93 and a cylindrical portion 94 having an outer diameter lower than the outer diameter of annular portion 93 and extending axially from this latter in longitudinal direction.

Outer portion 92 may be realized as a ring having inner diameter equal to outer diameter of cylindrical portion 94 of inner portion 91 and an outer diameter equal to inner surface of inner volume 68. Advantageously ring may slide on inner surface of inner volume 68 and on outer surface of cylindrical portion 94.

The operation of the hydraulic arrangement 1 for controlling a hydraulic tractor-trailer brake valve according to the present invention is the following.

Figure 2:
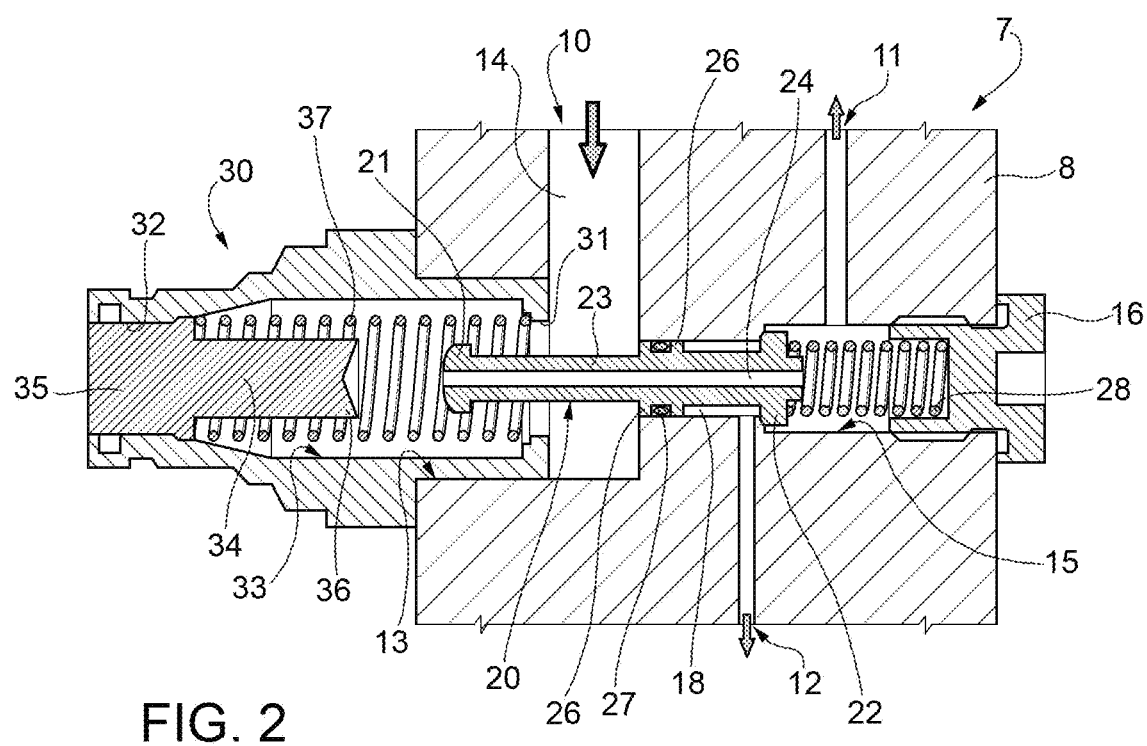
FIG. 2 is a section view of a first element of the hydraulic arrangement of the present invention in a first operative condition.

In a first operative condition of valve 7, shown in FIG. 2, coupler 30 is coupled with a non-MR trailer and therefore actuator 35 is placed so that first head 36 is in sealing contact with second opening 32. In such configuration, spool 20 is placed so that second head 22 is in sealing contact with duct 18. In this way fluid in pressure coming from first opening 10 flows through by-pass channel 24 from conduit 14 to chamber 15. Since second head 22 does not allow fluid to pass into duct 18 and consequently to drain by third opening 12, it flows directly to second opening 11 to curve selection stage 5.

Figure 4:
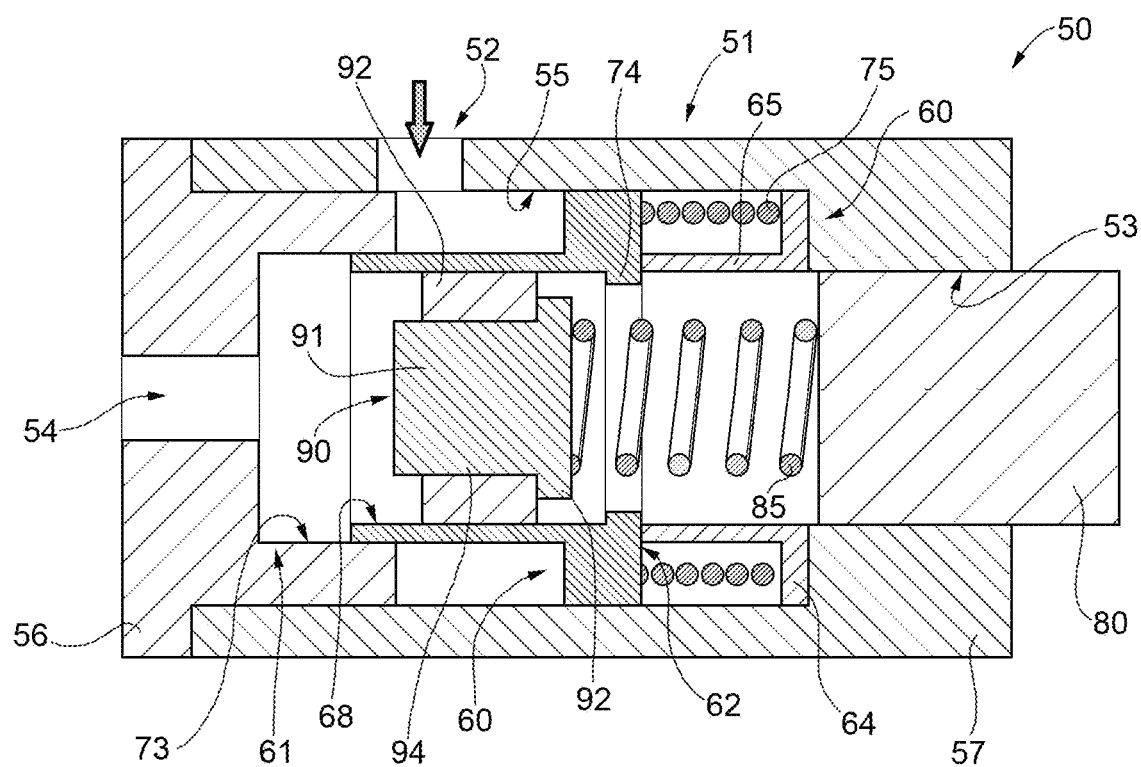
FIG. 4 is a section view of a second element of the hydraulic arrangement of the present invention in a first operative condition.
Figure 5:
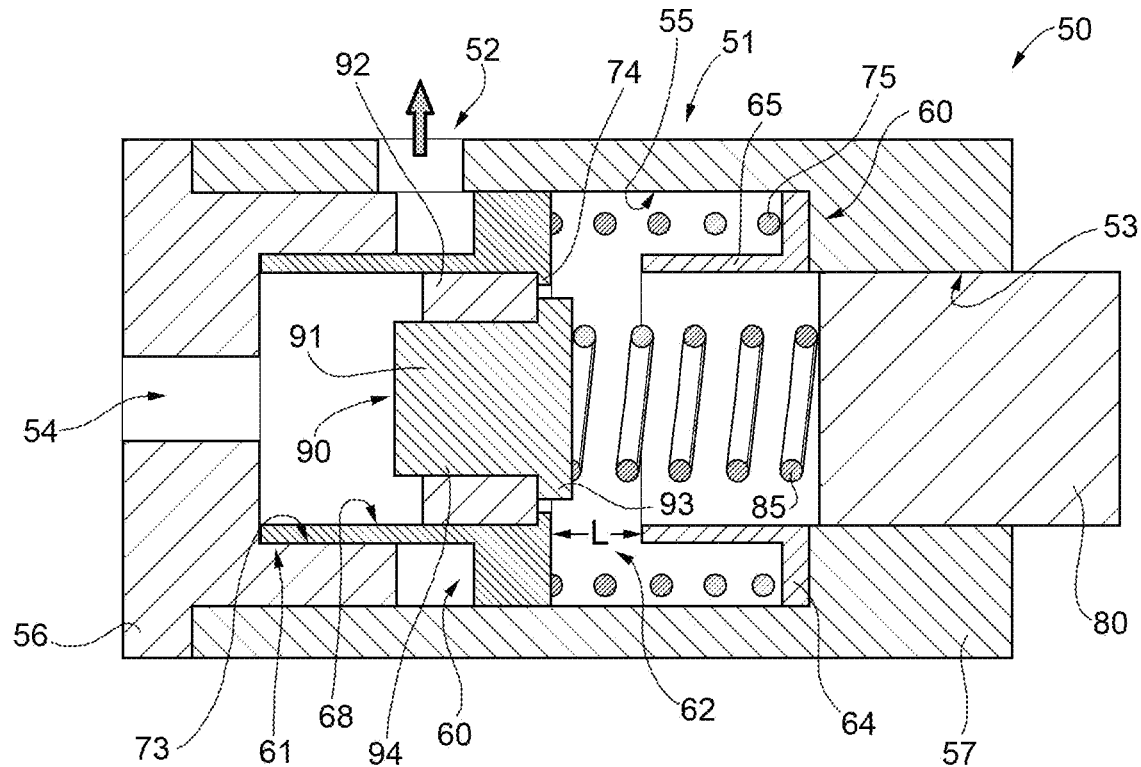
FIG. 5 is a section view of the element of FIG. 4 in a second operative condition.

According to the above described configuration (see FIG. 4) a source of fluid in pressure flows into chamber 55 of valve 50 by first opening 52, in particular in the portion between spool 60 and removable portion 56. Such fluid act on annular portion 71 of spool 60 thereby compressing spring 75 and pushing spool 60 to second end-stop 62, i.e. in the condition in which annular portion 71 is in contact with the extremity of cylindrical portion 65 of bushing 63.

In such configuration, fluid in pressure coming from opening 54 may act on axial surface of both inner and outer portions 91, 92 and therefore generate a first force acting on spool 80 via spring 85.

Figure 3:
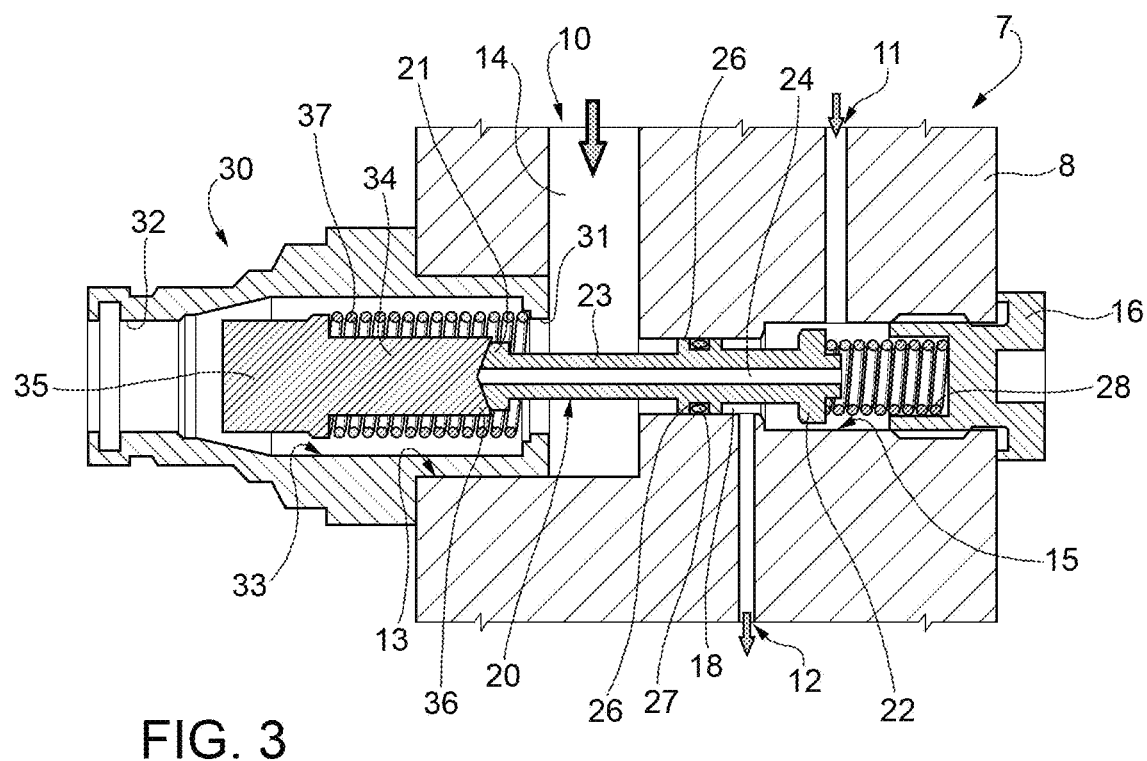
FIG. 3 is a section view of the element of FIG. 2 in a second operative condition.

In a second operative condition of valve 7, shown in FIG. 3, coupler 30 is coupled with a MR trailer and therefore actuator 35 is placed so that first head 36 is pushed inside with respect second opening 32, thereby allowing the passage of fluid through this latter.

Moreover, second head 37 of actuator 35 contacts first head 21 of spool 20, thereby pushing this latter against spring 28 and closing by-pass conduit 24 of spool 20; conduit 14 is therefore fluidly isolated from chamber 15. In this way, spool 20 is placed so that second head 22 is no more in sealing contact with duct 18 and therefore second opening 11 and drain opening 12 are in direct fluidic communication through duct 18; fluid therefore flows from curve selection stage 106 to drain (e.g. a tank of the tractor/trailer).

According to the above described configuration, fluid in pressure flows from chamber 55 of valve 50 by first opening 52 thereby decreasing the pressure in the portion between spool 60 and removable portion 56. Therefore, spring 75 pushes spool 60 to come back to first end-stop 61, i.e. in the condition in which cylindrical portion 72 of spool 60 is mainly housed in recess 73 of separable portion 65 of valve 50.

In such configuration, fluid in pressure coming from opening 53 may act on axial surface of only inner portion 91 to generate a second reaction with respect to the force acting on spool 80 via spring 85. In fact, outer portion 92 is blocked by coupling with annular flange 74 of spool 60.

First and second reactions to spring 85 force are different in the two described operative conditions of the hydraulic arrangement 1, in particular first reaction is bigger than second reaction because the area on which fluid in pressure coming from opening 54 may act is bigger (outer portion 92 plus inner portion 91).

In this way, spool 80 may be actuated by two different forces, according to the specific trailer that is connected to the tractor. In particular, as described above, spool 80 is actuated by a higher force when a non-MR trailer is connected. Spool 80 control pressure of trailer brake control line in known way according to such actuation force.

In view of the foregoing, the advantages of a hydraulic arrangement 100 for controlling a hydraulic tractor-trailer brake valve according to the invention are apparent.

Thanks to hydraulic arrangement 100 according to the invention, the hydraulic circuit connecting a trailer to a tractor no more comprise electrical connections configured to detect the typology of trailer connected to the tractor; therefore, such hydraulic arrangement 100 is cheaper and more compact.

Moreover, the use of a totally hydraulic signal in hydraulic arrangement 100 to select the actuation force on spool of trailer brake valve is more robust than an hybrid electrical-hydraulic arrangement.

Further, the above described valves 7, 50 may be integrated in the hydraulic circuit reducing spaces and economizing.

Since no electrical connection is needed, i.e. the interaction between tractor and trailer thanks to connectors 110, 111 is totally mechanical, the interaction between different typologies of tractor and trailer is simplified.

It is clear that modifications can be made to the described hydraulic arrangement 100 for controlling a hydraulic tractor-trailer brake valve which do not extend beyond the scope of protection defined by the claims.

For example, tractor brake circuit 101, which has been mentioned and has not been described for sake of brevity, may be realized in any way different from the one shown in FIG. 1.

Trailer brake valve 107, which has been mentioned and has not been described for sake of brevity, may be any known in the art and the hydraulic control signal imparted to spool 80 may be imparted to any other equivalent means in a different typology of brake valve 107.

Coupling stage 104 may be realized separately from trailer circuit 102 or integrated in other elements in known way.

The invention claimed is:

1. A hydraulic arrangement for connecting a tractor hydraulic brake circuit to a trailer hydraulic brake circuit, comprising:
    a coupler stage fluidly connecting a source of fluid in pressure to a trailer braking hydraulic circuit;
    a trailer brake valve fluidly connecting said tractor hydraulic brake circuit and said trailer hydraulic brake circuit;
    a selection pilot stage fluidly connected to said source of fluid in pressure and being fluidly connectable to said trailer hydraulic brake circuit via at least one connector; and
    a selection stage fluidly connected to said selection pilot stage and to said trailer brake valve, said selection stage being configured to impart an actuation signal to said trailer brake valve via a hydraulic signal coming from said selection pilot stage.

2. The hydraulic arrangement according to claim 1, wherein said selection pilot stage is integrated in said coupler stage.

3. The hydraulic arrangement according to claim 1, wherein said selection stage is integrated in said trailer brake valve.

4. The hydraulic arrangement according to claim 1, wherein the at least one connector comprises a first connector that connects to a standard line of said trailer hydraulic brake circuit and a second connector that connects to a supplementary line of said trailer hydraulic brake circuit.

5. The hydraulic arrangement according to claim 4, wherein said selection pilot stage comprises a valve comprising:
- a housing defining at least four openings, wherein the at least four openings comprise a first opening configured to be fluidly connected to said source of fluid in pressure, a second opening configured to be fluidly connected to said selection stage, a third opening configured to be fluidly connected to a drain, and a fourth opening configured to be fluidly connected to said first connector or said second connector; and
- an actuator configured to move differently with respect to said housing based on which of said first connector and said second connector is coupled to said fourth opening, wherein said actuator is configured to generate a different hydraulic flow passing through said second opening via the position of said actuator with respect to said housing.

6. The hydraulic arrangement according to claim 5, wherein said actuator is configured to generate at least a first flow passing through said second opening directed to drain via said third opening from said selection stage and a second flow passing through said second opening directed to said selection stage from said first opening.

7. The hydraulic arrangement according to claim 1, wherein said selection stage comprises a valve comprising:
- a housing defining at least two openings, wherein the at least two openings comprise a first opening configured to be fluidly connected to said pilot selection stage and a second opening configured to be fluidly connected to said tractor hydraulic brake circuit; and
- an actuator configured to generate a different control input to said trailer brake valve based on how a fluid flows through said first opening.

8. The hydraulic arrangement according to claim 7, wherein said actuator is configured to generate a first control input when said fluid flows through said first opening from said valve and a second control input when said fluid flows through said first opening into said valve.

9. The hydraulic arrangement according to claim 8, characterized in that said control input is a force applied to a spool of said trailer brake valve.

10. The hydraulic arrangement according to claim 8, wherein said control input is generated by the pressure of a fluid coming from said second opening acting on said actuator, said actuator defining a first area on which said fluid may act when said fluid flows through said first opening from said valve and a second area on which said fluid may act when said fluid flows through said first opening into said valve, said first and second areas being different.

11. The hydraulic arrangement according to claim 10, wherein said first area is less with respect to said second area.

* * * * *